United States Patent
Chiba et al.

(10) Patent No.: US 10,341,883 B2
(45) Date of Patent: Jul. 2, 2019

(54) METHOD AND APPARATUS FOR CLOSED SUBSCRIBER GROUP INFORMATION TRANSMISSION

(71) Applicant: Nokia Solutions and Networks Oy, Espoo (FI)

(72) Inventors: Tsunehiko Chiba, Saitama (JP); Srinivasan Selvaganapathy, Bangalore (IN); Xiang Xu, Jiangsu (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/129,113

(22) PCT Filed: Mar. 28, 2014

(86) PCT No.: PCT/EP2014/056384
§ 371 (c)(1),
(2) Date: Sep. 26, 2016

(87) PCT Pub. No.: WO2015/144253
PCT Pub. Date: Oct. 1, 2015

(65) Prior Publication Data
US 2017/0105128 A1 Apr. 13, 2017

(51) Int. Cl.
*H04M 3/00* (2006.01)
*H04W 24/02* (2009.01)
(Continued)

(52) U.S. Cl.
CPC ........... *H04W 24/02* (2013.01); *H04W 12/08* (2013.01); *H04W 48/02* (2013.01); *H04W 84/045* (2013.01)

(58) Field of Classification Search
CPC . H04W 8/245; H04W 24/00; H04M 1/72516; H04M 1/72533
See application file for complete search history.

(56) References Cited

U.S. PATENT DOCUMENTS 8,731,550 B2 * 5/2014 Radulescu ............ H04W 24/10
455/434
2011/0269465 A1 * 11/2011 Xu ..................... H04W 36/0033
455/436
(Continued)

FOREIGN PATENT DOCUMENTS

CN 102197687 A 9/2011
CN 102415159 A 4/2012
(Continued)

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842, V1.0.0, Nov. 2013, pp. 1-68.
(Continued)

*Primary Examiner* — Stephen M D Agosta
(74) *Attorney, Agent, or Firm* — Harrington & Smith

(57) ABSTRACT

A method comprises responsive to adding of an additional base station for a user equipment, said additional base station having a closed subscriber cell, causing a message to be transmitted to a network entity, said message comprising information identifying a closed subscriber group associated with said additional base station.

17 Claims, 5 Drawing Sheets

(51) Int. Cl.
*H04W 12/08* (2009.01)
*H04W 48/02* (2009.01)
*H04W 84/04* (2009.01)

(56) References Cited

U.S. PATENT DOCUMENTS

| | | | |
|---|---|---|---|
| 2013/0035134 A1 | 2/2013 | Suzuki et al. | |
| 2014/0082697 A1* | 3/2014 | Watfa | H04W 76/15 726/3 |

FOREIGN PATENT DOCUMENTS

| | | |
|---|---|---|
| WO | WO-2012/108399 A1 | 8/2012 |
| WO | WO-2013/024654 A2 | 2/2013 |
| WO | WO-2013/048193 A1 | 4/2013 |

OTHER PUBLICATIONS

"3rd Generation Partnership Project; Technical Specification Group Services and System Aspects; General Packet Radio Service (CPRS) enhancements for Evolved Universal Terrestrial Radio Access Network (E-UTRAN) access (Release 12)", 3GPP TS 23.401, V12.3.0, Dec. 2013, pp. 1-302.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.0.0, Dec. 2013, pp. 1-208.

"LS on System Aspects for Small Cell Enhancement Work in RAN", 3GPP TSG RAN WG3 Meeting #83, R3-140022, Feb. 10-14, 2014, 4 pages.

"Prioritization of Functions to Support Dual Connectivity", 3GPP TSG-RAN WG3 Meeting #83, R3-140114, Agenda: 20.1, Huawei, Feb. 10-14, 2014, pp. 1-3.

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413, V12.0.0, Dec. 2013, pp. 1-278.

Office action received for corresponding Vietnamese Patent Application No. 1-2016-03999, dated Nov. 21, 2016, 1 page of office action and 1 page of office action translation available.

International Search Report and Written Opinion received for corresponding Patent Cooperation Treaty Application No. PCT/EP2014/056384, dated Jun. 20, 2014, 12 pages.

NTT Docomo & NEC,; "Stage 2 Changes for Dual Connectivity", 3GPP TSG-RAN WG2 Meeting #85, R2-140049, Prague, Czech Republic, Feb. 10-14, 2014, 45 pages.

Alcatel-Lucent et al. "New Path Switch Procedure for Dual Connectivity" 3GPP TSG-RAN WG3 Meeting #83bis, R3-140775, Mar. 31-Apr. 4, 2014. <http://www.3gpp.org/ftp/tsg_ran/WG3_lu/TSGR3_83bis/Docs/>.

* cited by examiner

METHOD AND APPARATUS FOR CLOSED SUBSCRIBER GROUP INFORMATION TRANSMISSION

RELATED APPLICATION

This application was originally filed as Patent Cooperation Treaty Application No. PCT/EP2014/056384 filed Mar. 28, 2014.

Some embodiments relate to a method and apparatus and in particular but not exclusively to a method and apparatus for use in scenarios where a user device or equipment is in communication with two or more nodes or base stations.

A communication system may be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols may define the manner how communication devices shall communicate with the access points, how various aspects of the communications shall be implemented and how the devices and functionalities thereof shall be configured.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB may provide coverage for an entire cell or similar radio service area.

A user may access the communication system by means of an appropriate communication device. A communication device of a user is often referred to as user device (UE), user device or terminal. A communication device is provided with an appropriate signal receiving and transmitting arrangement for enabling communications with other parties. In wireless systems a communication device typically provides a transceiver station that may communicate with another communication device such as e.g. a base station and/or another user device. A communication device such as a user device (UE) may access a carrier provided by a base station, and transmit and/or receive on the carrier.

Signals may be carried on wired or wireless carriers. Examples of wireless systems include public land mobile networks (PLMN), satellite based communication systems and different wireless local networks, for example wireless local area networks (WLAN). Wireless systems may be divided into coverage areas referred to as cells, such systems being often referred to as cellular systems. A cell may be provided by a base station, there being various different types of base stations. Different types of cells may provide different features. For example, cells may have different shapes, sizes, functionalities and other characteristics. A cell is typically controlled by a control node.

In LTE-Advanced the network nodes can be wide area network nodes such as a macro eNode B (eNB) which may, for example, provide coverage for an entire cell. Alternatively in LTE-Advanced, network nodes can be small area network nodes such as femto eNBs (HeNB) or pico eNodeBs (pico-eNB). These cells may be configured to support local offload and may support any UE or UEs belonging to a closed subscriber group (CSG) or an open subscriber group (OSG).

According to an aspect, there is provided a method comprising: responsive to adding of an additional base station for a user equipment, said additional base station having a closed subscriber cell, causing a message to be transmitted to a network entity, said message comprising information identifying a closed subscriber group associated with said additional base station.

The message may further comprises at least one of: bearers allocated to one or more closed subscriber cells; information about radio access bearers to be switched; bearer type information; downlink tunnel endpoints; information indicating if a UE is single or dual connectivity mode; access mode information; closed subscriber group information and closed subscriber membership status information.

The bearer type information may indicate if the bearer is assigned to a secondary cell group or a split bearer.

The access mode information may indicate that said access mode is set to a hybrid access mode.

At least one of said access mode information, closed subscriber group information and the closed subscriber membership status information may be related to the secondary cell group The message may comprise at least one of path switch request message and an S1 message.

The method may comprise receiving update information indicating an updated membership of a user equipment to a closed subscriber cell.

The updated membership closed subscriber cell may be of the master base station or the at least one added base station.

The method may comprise causing resources associated with the updated membership of said user equipment to be released or modified.

The resources may be of at least one of a master base station and at least one secondary base station.

The method may comprise causing a change of secondary cell group.

The update information may include a bearer or closed subscriber group for the updated membership.

The method may comprise providing said update information to at least one additional base station The method may comprise sending closed subscriber identity information of said additional base station and a current base station, and receiving membership status of the added base station prior to the addition of said additional base station.

The method may be performed by an apparatus. The apparatus may be in a base station.

According to another aspect, there is provided a method comprising: receiving a message, said message comprising information identifying a closed subscriber group associated with an added base station, said added base station being added for a user equipment and having a closed subscriber cell The method may comprise determining a change in membership of the user equipment of the closed subscriber group and causing a user context modification request to be sent to a base station.

The user context modification request may comprise at least one of closed subscriber group membership status and the cell group with which said closed subscriber group membership status is associated.

The method may comprise determining that said user context modification request has not released one or more resources of said user equipment associated with the closed subscriber group and causing a bearer modification or bearer release or user equipment release message to be sent.

This may be done in dependence on one or more of membership status and information associated with the respective base station.

The method may comprise sending a GTP message indicating closed subscriber information for each bearer.

The method may be performed by an apparatus in a network entity. The network entity may be a mobility management entity.

According to another aspect, there is provided an apparatus comprising: means for, responsive to adding of an additional base station for a user equipment, said additional base station having a closed subscriber cell, causing a message to be transmitted to a network entity, said message comprising information identifying a closed subscriber group associated with said additional base station.

The message may further comprises at least one of: bearers allocated to one or more closed subscriber cells; information about radio access bearers to be switched; bearer type information; downlink tunnel endpoints; information indicating if a UE is single or dual connectivity mode; closed subscriber group information and closed subscriber membership status information.

The access mode information may indicate that said access mode is set to a hybrid access mode.

At least one of said access mode information, closed subscriber group information and closed subscriber membership status information may be related to the secondary cell group The message may comprise at least one of path switch request message and an S1 message.

The apparatus may comprise means for receiving update information indicating an updated membership of a user equipment to a closed subscriber cell.

The updated membership closed subscriber cell may be of the master base station or the at least one added base station.

The apparatus may comprise means for causing resources associated with the updated membership of said user equipment to be released or modified.

The resources may be of at least one of a master base station and at least one secondary base station.

The apparatus may comprise means for causing a change of secondary cell group.

The update information may include a bearer or closed subscriber group for the updated membership.

The apparatus may comprise means for providing said update information to at least one additional base station The apparatus may comprise means for causing the sending of closed subscriber identity information of said additional base station and a current base station, and receiving membership status of the added base station prior to the addition of said additional base station.

The apparatus may be in a base station.

According to another aspect, there is provided an apparatus comprising: means for receiving a message, said message comprising information identifying a closed subscriber group associated with an added base station, said added base station being added for a user equipment and having a closed subscriber cell The apparatus may comprise means for determining a change in membership of the user equipment of the closed subscriber group and causing a user context modification request to be sent to a base station.

The user context modification request may comprise at least one of closed subscriber group membership status and the cell group with which said closed subscriber group membership status is associated.

The apparatus may comprise means for determining that said user context modification request has not released one or more resources of said user equipment associated with the closed subscriber group and causing a bearer modification or bearer release or user equipment release message to be sent.

This may be done in dependence on one or more of membership status and information associated with the respective base station.

The apparatus may comprise means for causing a GTP message to be sent indicating closed subscriber information for each bearer.

The apparatus may be in a network entity. The network entity may be a mobility management entity.

According to another aspect, there is provided an apparatus, said apparatus comprising at least one processor and at least one memory including computer code for one or more programs, the at least one memory and the computer code configured, with the at least one processor, to cause the apparatus at least to: responsive to adding of an additional base station for a user equipment, said additional base station having a closed subscriber cell, cause a message to be transmitted to a network entity, said message comprising information identifying a closed subscriber group associated with said additional base station.

The message may further comprises at least one of: bearers allocated to one or more closed subscriber cells; information about radio access bearers to be switched; bearer type information; downlink tunnel endpoints; information indicating if a UE is single or dual connectivity mode; access mode information and closed subscriber group information and closed subscriber membership status information.

The access mode information may indicate that said access mode is set to a hybrid access mode.

The closed subscriber group information may comprise secondary cell group closed subscriber identity information The message may comprise at least one of path switch request message and an S1 message.

The at least one memory and the computer code may be configured, with the at least one processor to receive update information including a bearer or closed subscriber group for the updated membership.

The updated membership closed subscriber cell may be of the master base station or the at least one added base station.

The at least one memory and the computer code may be configured, with the at least one processor to cause resources associated with the updated membership of said user equipment to be released or modified.

The resources may be of at least one of a master base station and at least one secondary base station.

The at least one memory and the computer code may be configured, with the at least one processor to cause a change of secondary cell group.

The update information may be received in a user equipment context modification message.

The at least one memory and the computer code may be configured, with the at least one processor to provide said update information to at least one additional base station The at least one memory and the computer code may be configured, with the at least one processor to cause the sending of closed subscriber identity information of said additional base station and a current base station, and receive membership status of the added base station prior to the addition of said additional base station.

The apparatus may be in a base station.

According to another aspect, there is provided an apparatus, said apparatus comprising at least one processor and at least one memory including computer code for one or more programs, the at least one memory and the computer code configured, with the at least one processor, to cause the apparatus at least to: receive a message, said message comprising information identifying a closed subscriber group associated with an added base station, said added base station being added for a user equipment and having a closed subscriber cell The at least one memory and the computer code may be configured, with the at least one processor to determine a change in membership of the user equipment of the closed subscriber group and cause a user context modification request to be sent to a base station.

The user context modification request may comprise at least one of closed subscriber group membership status and the cell group with which said closed subscriber group membership status is associated.

The at least one memory and the computer code may be configured, with the at least one processor to determine that said user context modification request has not released one or more resources of said user equipment associated with the closed subscriber group and causing a bearer modification or bearer release or user equipment release message to be sent.

This may be done in dependence on one or more of membership status and information associated with the respective base station.

The at least one memory and the computer code may be configured, with the at least one processor to cause a GTP message to be sent indicating closed subscriber information for each bearer.

The apparatus may be in a network entity. The network entity may be a mobility management entity.

A computer program product comprising program code means which when loaded into a processor controls the processor to perform the method may also be provided.

Various other aspects and further embodiments are also described in the following detailed description and in the attached claims.

Some embodiments will now be described in further detail, by way of example only, with reference to the following examples and accompanying drawings, in which.

Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 1:
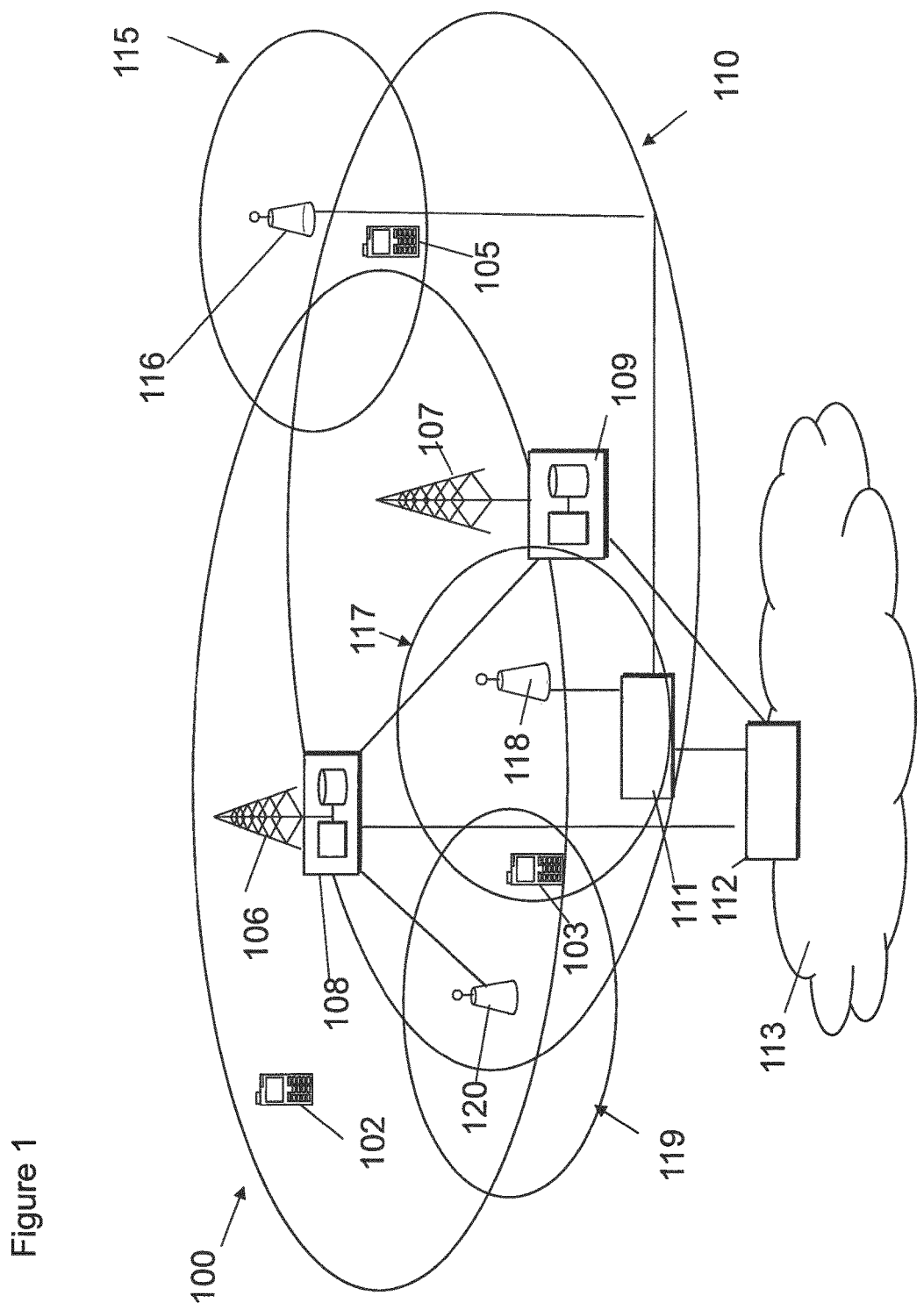
FIG. 1 shows a schematic diagram of a network according to some embodiments.
Figure 2:
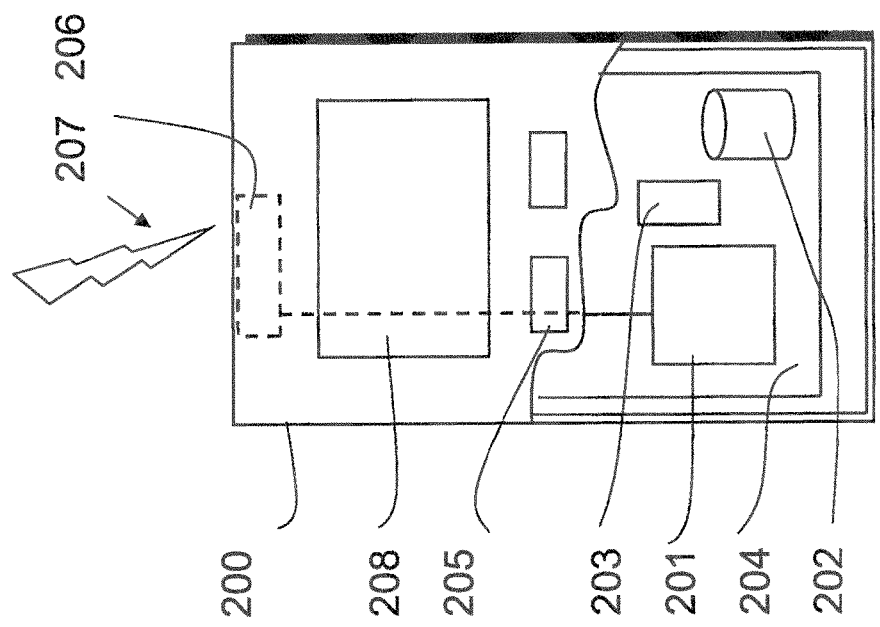
FIG. 2 shows a schematic diagram of a mobile communication device according to some embodiments.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. The smaller base stations may provide a femto cell, a pico cell, a micro cell, and/or the like. One or more of the cells in a network may be have a closed subscriber group meaning that only some devices are able to use that cell. A CSG cell is a closed access mode cell that is only accessible by those UE who are the member of the CSG cell. An open cell is accessible by all UEs. A hybrid cell is a hybrid access mode cell. It may be accessible by all UEs, but also provide a premium service to those UEs who are the member of the hybrid cell A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs). Other examples of radio access system include those provided by base stations of systems that are based on technologies such as wireless local area network (WLAN) and/or WiMax (Worldwide Interoperability for Microwave Access).

Figure 3:
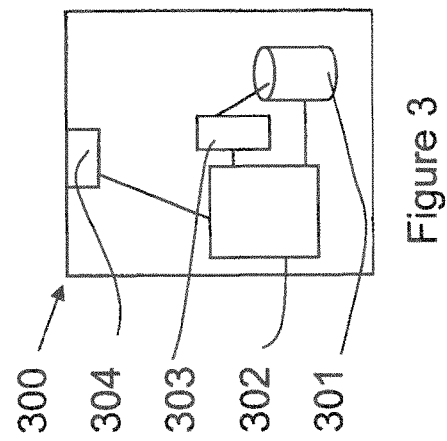
FIG. 3 shows a schematic diagram of a control apparatus according to some embodiments.

FIG. 3 shows an example of a control apparatus 300. This control apparatus may be provided in one or more of a base station, a MME, a S-GW, P-GW or any other suitable entity. The control apparatus can be configured to provide control functions. For this purpose the control apparatus comprises at least one memory 301, at least one data processing unit 302, 303 and an input/output interface 304. Via the interface the control apparatus can be coupled to receive and/or provide data. The control apparatus can be configured to execute an appropriate software code to provide the control functions.

From time to time, mobile communication devices move from the coverage area of one base station to the coverage area of another base station. Controlling communications of mobile communication devices is known as mobility management. Mobility management provides control of active mobile devices moving within a certain area. In cellular systems mobility management is provided by a particular control entity. For example, in LTE each access system is provided with a mobility management entity MME. A MME control node can be involved, among other things, in idle mode user equipment tracking and paging procedures including retransmissions, in bearer activation/deactivation processes and in choosing a serving gateway (SGW) for a user equipment at the initial attach and at time of intra-LTE handover involving core network (CN) node relocation.

Some embodiments relate to CSG support in dual connectivity operation. When the UE and network have a dual connectivity capability, it is possible to add the CSG-cells as SCG (secondary cell group) of the connection. A secondary cell group is the group of serving cells which is associated with a secondary eNB (SeNB). A SeNB is the eNB in dual connectivity providing resources for the UE, and is not the Master eNB (MeNB). The master cell group MCG is the group of serving cells associated with the MeNB.

With a UE having dual connections over two cells, of which only one cell has a different CSG, issues such as the access control and membership expiry need to be handled in a different way from that in single connectivity-case.

In dual connectivity, a UE is served by two schedulers one from MeNB and another from a SeNB. It is possible that some ERABs (EPS (evolved packet system) radio access bearer) are terminated in MeNB and some ERABs in the SeNB directly. This type of bearer distribution is called User-plane option 1A in some standards. In some cases, a bearer is terminated in MeNB but the bearer is split at the PDCP level and uses RLC (radio link control) instances at both nodes. This option is user-plane option 3C.

Currently, a path switch message or a S1 message is needed whenever the CSG SeNB is added to the UE. S1 is the interface between the eNB and the core for option 1A. This is because the message is used to inform the inclusion of the CSG Cell in UE dual connectivity. Some embodiments may also use such a message for option 3C.

Some embodiments provide signaling used by the MeNB to indicate to the MME the CSG ID and/or the access mode of the UE towards a CSG SeNB. In one embodiment a path switch procedure is used to allow the MeNB to indicate to the MME the CSG ID and the access mode of the UE for a newly added CSG SeNB. This embodiment may be appropriate if the MeNB is open. If the MeNB is CSG, a message may be provided for the CSG ID of the SeNB. This may be in an S1 .message.

CSG in SC (single connectivity) will be described first. It has been proposed for mobility towards CSG-cells, if CSG-cells are deployed in a system, the macro-cells will inform its CSG-PSC (Primary Scrambling Code) list via SI (System Information) towards UE. The CSG capable UEs may be configured for reporting the CSG-proximity indication via a measurement control message. This may allow a UE to report its proximity via a measurement report.

Once the proximity is reported, and if any PCI (Physical Cell Identities) which corresponds to CSG-PCI is reported in the measurement report, the eNB will request CGI reporting along with SI for this PCI. Based on UE reported information CSG membership is known and the eNB can trigger the handover procedure. In case of S1 based handover, the CN (Core Network) will check the target-cell CSG-ID and UE membership of the same and if not allowed the relocation is rejected.

In the case of X2 based handover, the relocation is executed first and as part of path switch procedure, the CN verifies the membership. If there is no membership for the target CSG-ID, the CN shall release the UE context after some timeout waiting for the target-node to take some action such as handover or release of the UE.

For UE access to CSG-Cells, based on the UE CSG-subscription list the UE will access a CSG-cell. In case of manual CSG selection, the UE will send an attach/tracking area update via the CSG-cell for a subscription update and if the location update is accepted, this CSG-cell is included in UE CSG-list of CSG membership status.

If the UE membership for a CSG-cell expires or the operator removes the CSG-cell from the UE list, the CN will be informed about the same. If there is an ongoing active S1 connection for the UE, the CN will inform the eNB of the membership status change and expect the eNB to handover the call to other suitable cells. If the handover is not executed within a specific duration, the MME may trigger the release of the UE context. If the target-cell is a hybrid cell, the CN sends the change in membership status via a UE context modification and eNB changes the resource assignments as per the latest membership status. There is no further action from the MME in this case, that is no release of UE context.

When the UE and network have dual connectivity capability, it is possible to add the CSG-cells as a SCG (secondary group cell) of the connection. With a UE having connections over two cells and one cell has a different CSG, the access control and membership expiry needs to be handled in different way than in single connectivity-case.

Some embodiments may address a scenario in which the UE starting its connection with MeNB (master eNB) with open access and adding the CSG-cell as SCG. Some embodiments may address a scenario in which the UE is starting its connection with a MeNB with a CSG-cell and adds a different CSG cell as the SCG of the dual connection.

Some embodiments may use an existing path-switch procedure to handle the CSG cell inclusion and the UE context modifications. Some embodiments may use a S1 procedure towards MME to update the SCG-addition/release events and the one or more messages of this procedure may include information for the MME to handle the CSG cells in the case of a dual connectivity UE. The MeNB may be open and the SeNB is CSG.

A PCell (primary cell) of the RRC connection may be included in the MCG

Some embodiments may use a path-switch procedure to update the CSG-ID information to the MeNB.

In some embodiments, whenever the MeNB successfully adds a SeNB (secondary eNB) which is a CSG-cell and which is to also serve a UE in a dual connectivity mode, the MeNB sends a path switch request message (PATH-SWITCH-REQ) message to the core network CN. This message may include the CSG identity (CSG-ID) of the SCG and the access-mode is set to hybrid. The access-mode is set to hybrid to avoid any CN initiated UE context release based on the CSG-ID of the SeNB.

On reception of the CSG-ID along with access-mode set to hybrid, the MME considers that the UE switched its connection to a hybrid cell. Whenever a UE membership expires for this CSG, the MME informs the MeNB via a UE context modification procedure, for example.

On reception of the change of membership status, the MeNB will take action to release the resources in the current SeNB and move the UE back to MeNB or another suitable SeNB.

Figure 4:
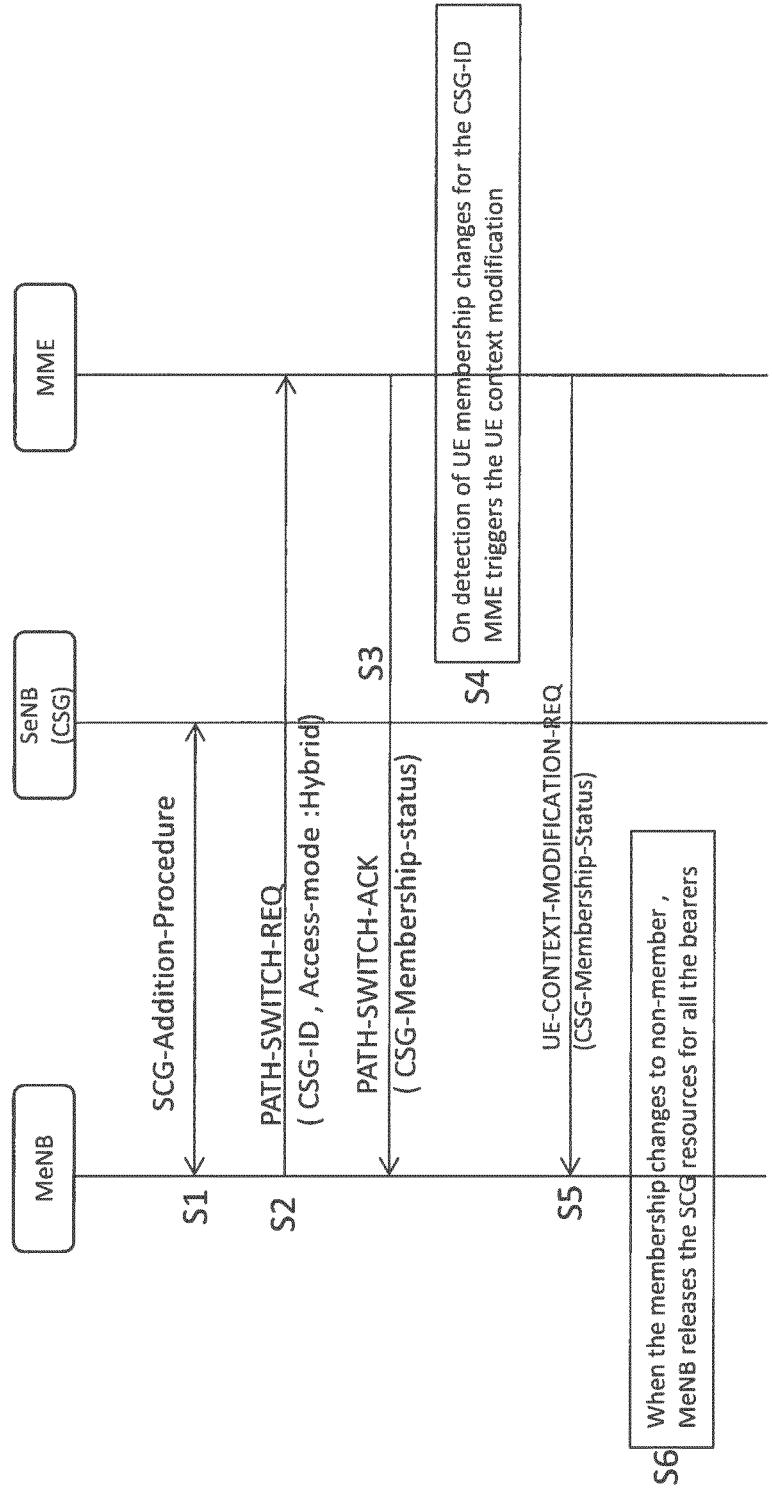
FIG. 4 illustrates a signalling diagram of a method according to some embodiments.

Reference is made to FIG. 4 which shows the signal flow in an embodiment where the MeNB uses an existing path-switch procedure to inform the CSG-ID of the SCG to the MME. The MeNB includes the access-mode parameter in the path-switch message as hybrid.

In step S1, on receipt of an event such as a measurement report from the UE, the MeNB initiates the SCG addition procedure to add the first cell of the SCG for the UE. The message may include the MCG configuration for UE capability coordination to be used as a basis for the reconfiguration by the SeNB. The SeNB sends the RRC Reconfiguration message to include its SCells as SCG (Secondary Cell group) to the UE along with the SCG bearers configured to use SCG for its operations.

In step S2, the MeNB initiates the path switch request procedure to inform the MME that the UE has added new SCG. The path switch request message may comprise the CSG identity (ID) and have the access-mode set to hybrid.

In step S3, the MME sends a path switch acknowledgement from the MME to the MeNB. This includes a CSG membership status.

In step S4, the MME determines that the UE membership changes for the CSG-ID and triggers the UE context modification.

In step S5, the MME sends a UE context modification message request which has a CSG membership status.

In step S6, when the membership changes to non-member, the MeNB releases the SCG resources for all the bearers or can change the bearer to another suitable SCG or move the bearers back to the MeNB.

With the above embodiment, the CN will assume that the UE is connected via a CSG-cell whose access-mode is hybrid. As the CN assumes that the UE current cell is hybrid, it will not initiate UE context release at any point of time. Instead the CN will only update the membership status changes to the MeNB via a UE context modification procedure. The MeNB take actions such as SCG change or SCG release when it receives the CSG-membership status from the CN which changes the status of a UE to being a non-member. If the SeNB is a hybrid cell, the MeNB may take the following action. On reception of membership expiry information, the MeNB passes the change of membership information to the SeNB. The SeNB now can taken actions based on its internal policy to modify the resource priority allocation to this UE as a non-member.

Path switch may be needed for user-plane option 1A to change the downlink endpoint from the MeNB to the SeNB for non-CSG cases. In the case that the SCG is a CSG-cell, the path-switch message is used for the user-plane option 3C (split bearer case) also to inform the CN about the inclusion of CSG for the UE context.

This embodiment may have the advantage that an existing path-switch procedure itself may be used for the access control actions related to the CSG-cell.

In another embodiment, this may be a S1 procedure to inform the MME about adding a SCG with a CSG, with one or more parameters about bearer mapping to the SCG.

On successful completion of a SCG addition, the MeNB sends the MME a message advising of the change of the downlink tunnel-endpoints. The message may be a S1 message, e.g., an addition request message. This may be performed when the MCG bearers are moved to the SCG as part of a SCG addition. This may be used for user plane option 1A, that is the non-split bearer case. This step may not be needed for split bearers if the SCG is not a CSG.

If the SCG is a CSG cell, the S1 SCG addition request message may be sent irrespective of bearer type. The bearers may be dedicated or split. In this embodiment the message may comprise parameters such as dedicated bearers and/or split bearers mapped to the SCG along with CSG related information of the SCG. The MME acts accordingly to inform the PGW for correct CSG charging. The MME informs the SGW and SGW informs the PGW regarding which bearer is related to SeNB's CSG and/or MeNB's CSG. In single connectivity all EPS bearers are related to the CSG cell. but in dual connectivity, some EPS bearers are related to MeNB (e.g. CSG1), and some EPS bearers are related to SeNB (e.g. CSG2).

The MME may take the action based on the bearers mapped to the CSG-cell, when the UE membership expires or is removed for the CSG. The MME may trigger the release of ERABs corresponding to SCG bearers. In case there are split bearers allocated, the MME will trigger an ERAB modification message to the MeNB to release the bearer from being a MCG bearer.

For User Plane option 1A, first the MME indicates the change of membership to MeNB. The MeNB is expected to move back the bearers to MeNB or any other non-CSG SeNB or handover the UE to one or more other cells. On timer expiry, if the SCG bearers remain active on the CSG-cell, the MeNB will initiate RAB-Release to release these bearers alone instead of UE context release.

In the same way for User plane option 3C (split bearers), the MME first sends membership status change for the MeNB to take action. If no actions are taken within a timeout, the MME will send a S1 message to release the split bearer.

This may be used in some embodiments, where the MeNB has one CSG-ID and a SeNB has another CSG-ID. With this embodiment, on reception of a SCG addition request the MME knows that the UE has dual connectivity with two different CSGs. In this case MME takes different action based on which CSG is related to the expired CSG membership status. If the membership expires for SCG CSG the same action mentioned above may be applied. If the membership for the MCG expires and no action such as a handover was triggered from the MeNB, the MME initiates an S1 release.

To allow the MeNB to identify whether the membership expiry is meant for the MCG or the SCG, the UE context modification message may include an additional parameter to indicate the related CSG, or whether the membership status change is for a MCG or a SCG.

Figure 5:
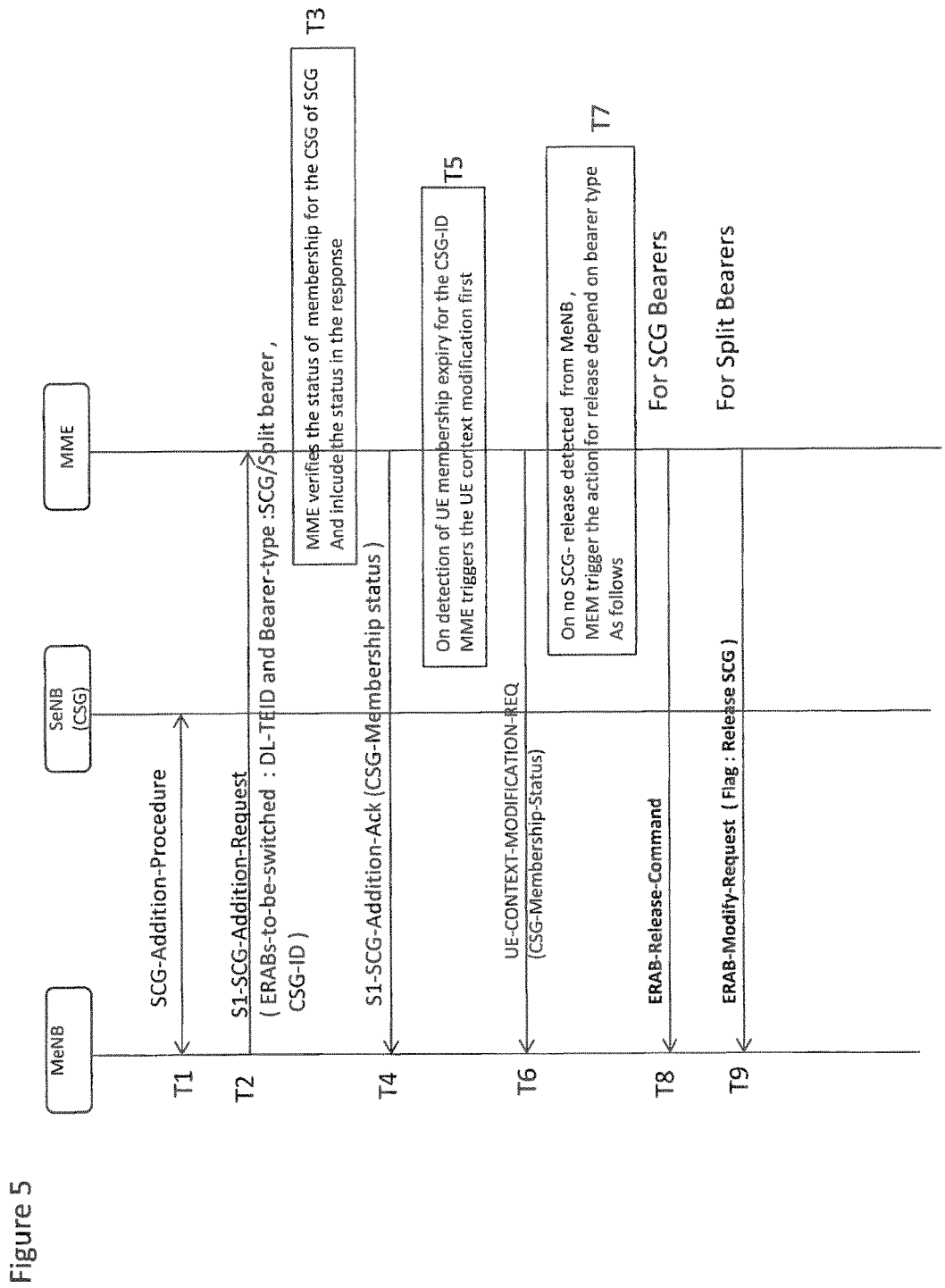
FIG. 5 illustrates a signalling diagram of a method according to some embodiments.
Figure 6:
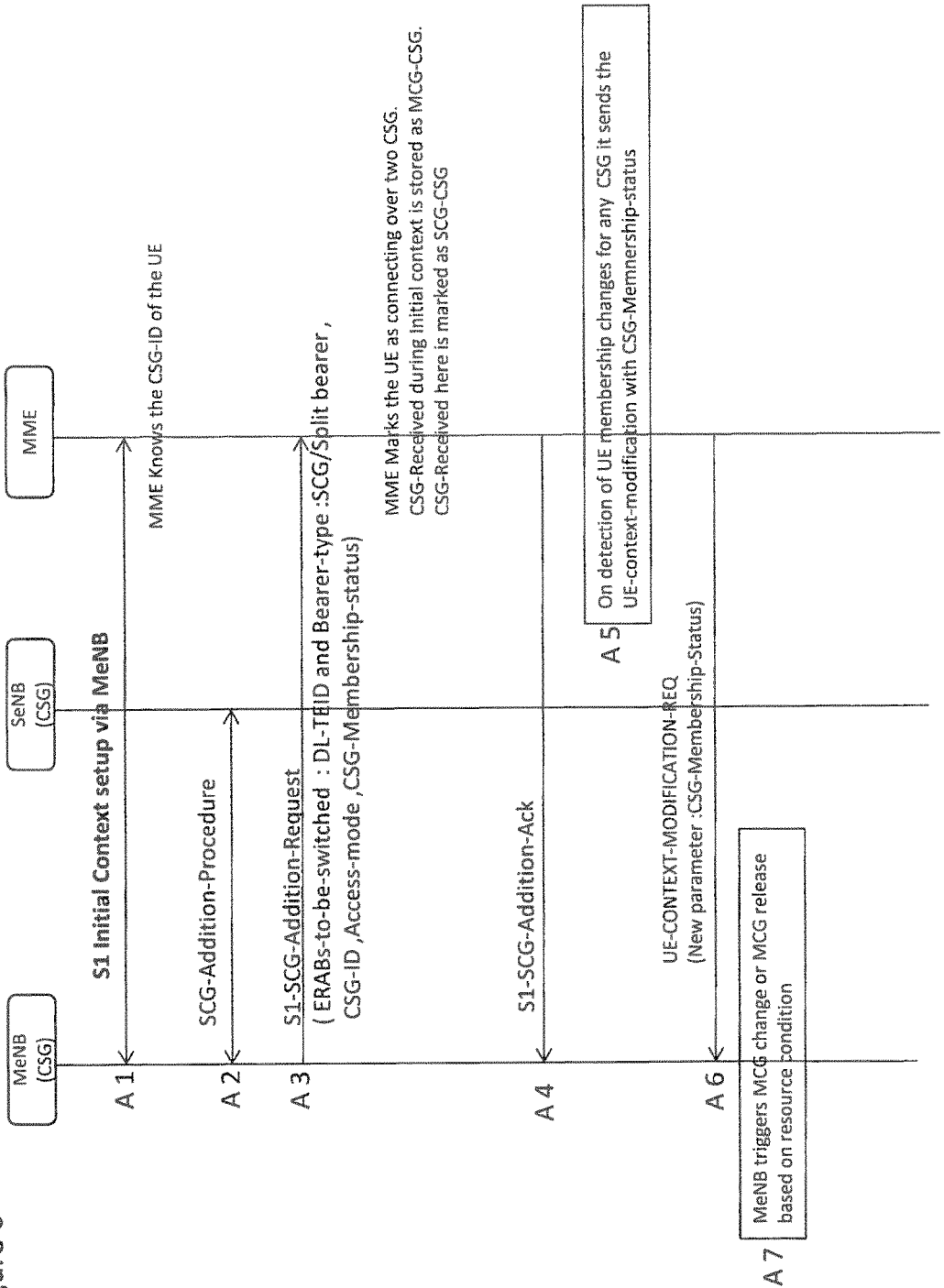
FIG. 6 illustrates a signalling diagram according to some embodiments.

Reference is made to the signal flow of FIG. 5 which shows SCG addition and membership change handling.

In step T1, an SCG addition procedure is initiated between the MeNB and SeNB.

In step T2 an SCG addition request is sent from the MeNB and contains the following additional information: ERABs to be switched for DL-TEID (down link tunnel endpoint identity) changes; CSG-ID of the SCG; access mode will be included only for a hybrid cell in some embodiments: and the details of bearer distribution for each RAB such as whether the RABs assigned to a SCG are a SCG bearer or a split bearer. For closed access CSG the access mode parameter may not be included.

In step T3, on reception of this message, the MME knows the bearer distribution across the MCG and SCG based on the above information. The MME verifies the status of the membership for the CSG of the SCG.

In step T4, the MME sends the SCG addition acknowledgment with the status of the CSG membership.

In case the added cell is a closed mode cell, Step T2-T4 may be executed before Step T1

The MME will also inform the S-GW/P-GW about the added CSG information and the related EPS bearers for correct CSG charging. This requires enhancement in GTP-C procedures, e.g. Create Session Request, Modify Bearer Request, etc. In particular there will be CSG information for each individual bearer. This CSG information may comprise CSG identity information and access mode.

In step T5, the MME detects that the UE membership has expired for the CSG and triggers the UE context modification.

In step T6, on expiry of the CSG membership status the MME informs the MeNB of the MCG modification via a UE-context-modification request message. The existing UE-context-modification request message may be modified to include the associated CSG or a separate message may be sent.

In step T7, if no action is taken based on this message, the MME will trigger the release of SCG resources of the bearers, dependent on the bearer type.

In the case of a SCG bearer, the next step is step T8 and an ERAB release command is sent from the MME to the MeNB.

In the case of a split bearer, the next step is step T9 and an E-RAB modification request is sent from the MME to the MeNB with the flag release SCG.

Reference is now made to FIG. 7 which shows another signal flow. In the case that the UE has dual connectivity over two different CSG-cells, the MCG may include the information of SCG in the initial UE message procedure, or the MCG may choose to initiate the SCG add procedure after the attach is completed. The MeNB and SeNB have different CSGs in this embodiment.

In step A1, an initial S1 context is setup via the MeNB involving communication between the MME and the MeNB. The MME know the CSG identity of the MeNB. In step A2 there is an SCG addition procedure between the MeNB and the SeNB.

In step A3, there is an S1 SCG addition request from the MeNB to the MME. This may contain the same information as the addition request of step T2. In addition, the access mode and the CSG membership status may be provided. The MME may mark the UE as connecting over two CSGs. The CSG received during the initial context is stored as MCG-CSG. The CSG received via the addition request is marked as SCG-CSG.

In step A4, the MME sends an S1 SCG addition acknowledgement.

In case the added cell is a closed mode cell, Step A3 and A4 may be executed prior to Step A2.

In step A5, the MME on detection of UE membership changes for any CSG will trigger the sending of the UE context modification with the CSG membership status SCG or MCG.

In step A6, the UE context modification request is sent from the MME to the MeNB and has the information that the CSG-Membership status corresponds to MCG or SCG.

The next step is step A7. In the case of a CSG membership status change for the MeNB, the MeNB can decide to handover the UE to other suitable cells. At this point MeNB implementation can trigger handover towards the SeNB instead.

It is possible that the MeNB is aware of the target SeNB prior to initiation of the S1 initial UE message. In this case the MeNB may include the CSG-ID details of the SCG in the initial UE message itself. For this purpose the initial UE message may include the additional information CSG information SCG. The S1-Initial-Context-setup request message in this case may include the CSG membership status for SCG also.

In this case MME may send the CSG-Membership status of CSG in S1-Initial-Context-setup-request message. If the membership status indicates that UE is not member for SCG cells, MeNB will not consider this base station for addition for UE connectivity.

If the MeNB connects to a MME which does not support S1 messages, the MeNB may store the access-mode of SeNB, but send the access mode as hybrid towards MME.

Thus some embodiments may use the path-switch message for informing SCG CSG-ID and the MeNB may decide on action based on MME response.

Thus some embodiments may use a S1 message to indicate the CSG-ID of SCG along with the bearer mapped to it and the split-bearer-information—

Thus some embodiments, in a dual connectivity situation, over two CSGs, the MME action depends on whether the membership expires for MCG or SCG.

Thus some embodiments, may update the PGW/SGW about membership changes and this may be related to specific bearers and not for the UE context.

Thus some embodiments an S1 initial UE message may inform of dual CSG status and based on the response itself decide to add SCG or not.

Thus some embodiments a membership status change message may include additional information (for both MeNB and SeNB) on different CSG.

Thus some embodiments, even in the hybrid SCG cell, when the MeNB receives the membership status change, the same is communicated to the SeNB and the SeNB can take action on how to reprioritize the resources.

It is noted that whilst embodiments have been described in relation to LTE-Advanced, similar principles can be applied to any other communication system. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments there are several variations and modifications which may be made to the disclosed solution without departing from the scope of the present invention.

The required data processing apparatus and functions of a base station apparatus, a mobile communication device and any other appropriate station may be provided by means of one or more data processors.

It should be understood that each block of the flow diagrams and any combination thereof may be implemented by various means or their combinations, such as hardware, software, firmware, one or more processors and/or circuitry. An apparatus suitable to carry out embodiments described above may in general include at least one processor, controller or a unit designed for carrying out control functions and being operably coupled to at least one internal or external memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof.

It should be understood that conveying, broadcasting, signalling, transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to the terms transmission and reception as well.

It is also noted herein that while the above describes exemplifying embodiments of the invention, there are several variations and modifications which may be made to the disclosed solution without departing from the scope of the present invention.

The invention claimed is:

1. An apparatus comprising:
   at least one processor and at least one memory including computer code for one or more programs, the at least one memory and the computer code configured, with the at least one processor, to cause the apparatus at least to:
   responsive to adding of an additional base station for a user equipment, said additional base station having a closed subscriber cell, cause a message to be transmitted from a base station to a network entity,
   said message comprising information identifying a closed subscriber group associated with said additional base station, downlink tunnel endpoints, and information indicating if said user equipment is single or dual connectivity mode,
   wherein said message further comprises at least one of:
   information of bearers allocated to one or more closed subscriber cells;
   information about radio access bearers to be switched; bearer type information;
   access mode information,
   wherein said access mode information indicates said access mode is set to hybrid access mode; or
   closed subscriber group information and closed subscriber membership status information.

2. An apparatus as claimed in claim 1, wherein at least one of said access mode information; said closed subscriber group information and said closed subscriber membership status information is related to a secondary cell group.

3. An apparatus as claimed in claim 1, wherein said message comprises at least one of path switch request message and an S1 message.

4. An apparatus as claimed in claim 1, wherein at least one memory and the computer code are further configured, with the at least one processor, to cause the apparatus at least to receive update information indicating an updated closed subscriber membership status of said user equipment to the closed subscriber cell.

5. An apparatus as claimed in claim 4, wherein said updated closed subscriber membership to the closed subscriber cell is to a master base station or the additional base station.

6. An apparatus as claimed in claim 4, wherein at least one memory and the computer code further configured, with the at least one processor, to cause the apparatus at least to cause resources associated with the updated closed subscriber membership of said user equipment to be released or modified.

7. An apparatus as claimed in claim 4, wherein said update information comprises information of a bearer or said closed subscriber group for the updated membership.

8. An apparatus as claimed in claim 4, wherein at least one memory and the computer code further configured, with the at least one processor, to cause the apparatus at least to provide said update information to the additional base station.

9. An apparatus as claimed in claim 1, wherein at least one memory and the computer code further configured, with the at least one processor, to cause the apparatus at least to send closed subscriber identity information of said additional base station and a current base station, and receive membership status of the additional base station prior to the adding of said additional base station.

10. An apparatus comprising:
    at least one processor and at least one memory including computer code for one or more programs, the at least one memory and the computer code configured, with the at least one processor, to cause the apparatus at least to:
    receive a message, said message comprising information identifying a closed subscriber group associated with an added base station, said added base station being added for a user equipment and having a closed subscriber cell, downlink tunnel endpoints, and information indicating if said user equipment is single or dual connectivity mode,
    wherein said message further comprises at least one of:
    information of bearers allocated to one or more closed subscriber cells;
    information about radio access bearers to be switched;
    bearer type information;
    access mode information, wherein said access mode information indicates that said access mode is set to hybrid access mode; or
    closed subscriber group information and closed subscriber membership status information.

11. An apparatus as claimed in claim 10, wherein the at least one memory and the computer code configured, with the at least one processor, to cause the apparatus at least to determine a change in the closed subscriber membership status of the user equipment of the closed subscriber group and cause a user context modification request to be sent to a base station.

12. An apparatus as claimed in claim 11, wherein said user context modification request comprises at least one of closed subscriber group membership status and a cell group with which said closed subscriber group membership status is associated.

13. An apparatus as claimed in claim 11, wherein the at least one memory and the computer code configured, with the at least one processor, to cause the apparatus at least to determine that said user context modification request has not released one of more resources of said user equipment associated with the closed subscriber group and cause a bearer modification or bearer release or user equipment release message to be sent.

14. An apparatus as claimed in claim 10, wherein the at least one memory and the computer code configured, with the at least one processor, to cause the apparatus at least to send a GTP message indicating closed subscriber information for each bearer.

15. A method comprising:
responsive to adding of an additional base station for a user equipment, said additional base station having a closed subscriber cell, causing a message to be transmitted from a base station to a network entity, said message comprising information identifying a closed subscriber group associated with said additional base station, downlink tunnel endpoints, and
information indicating if said user equipment is single or dual connectivity mode,
wherein said message further comprises at least one of:
information of bearers allocated to one or more closed subscriber cells;
information about radio access bearers to be switched;
bearer type information;
access mode information,
wherein said access mode information indicates said access mode is set to hybrid access mode; or
closed subscriber group information and closed subscriber membership status information.

16. A method comprising:
receiving a message from a base station at a network entity, said message comprising information identifying a closed subscriber group associated with an added base station, said added base station being added for a user equipment and having a closed subscriber cell, downlink tunnel endpoints, and information indicating if said user equipment is single or dual connectivity mode,
wherein said message further comprises at least one of:
information of bearers allocated to one or more closed subscriber cells;
information about radio access bearers to be switched;
bearer type information;
access mode information,
wherein said access mode information indicates said access mode is set to hybrid access mode; or
closed subscriber group information and closed subscriber membership status information.

17. A computer program product embodied on a non-transitory computer readable medium storing computer executable instructions which when executed by a computer cause a message to be transmitted from a base station to a network entity, responsive to adding of an additional base station for a user equipment, wherein said additional base station having a closed subscriber cell and said message comprising information identifying a closed subscriber group associated with said additional base station, downlink tunnel endpoints, and information indicating if said user equipment is single or dual connectivity mode,
wherein said message further comprises at least one of:
information of bearers allocated to one or more closed subscriber cells;
information about radio access bearers to be switched;
bearer type information;
access mode information,
wherein said access mode information indicates said access mode is set to hybrid access mode; or
closed subscriber group information and closed subscriber membership status information.

\* \* \* \* \*